(12) United States Patent
Datta et al.

(10) Patent No.: US 8,379,416 B1
(45) Date of Patent: Feb. 19, 2013

(54) POWER CONVERSION SYSTEM AND METHOD

(75) Inventors: Rajib Datta, Niskayuna, NY (US); Ravisekhar Nadimpalli Raju, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/219,961

(22) Filed: Aug. 29, 2011

(51) Int. Cl.
    *H02J 3/00* (2006.01)
(52) U.S. Cl. .................. 363/34; 363/35; 363/65
(58) Field of Classification Search .......... 363/34, 363/35, 65, 69, 70, 71
    See application file for complete search history.

(56) References Cited

U.S. PATENT DOCUMENTS

| | | | |
|---|---|---|---|
| 7,324,360 B2 | 1/2008 | Ritter et al. | |
| 7,327,134 B1 | 2/2008 | Weng et al. | |
| 7,359,223 B2 | 4/2008 | Datta et al. | |
| 7,471,525 B2 * | 12/2008 | Suzuki et al. | 363/37 |
| 7,532,490 B2 | 5/2009 | Datta et al. | |
| 7,633,775 B2 | 12/2009 | Datta et al. | |
| 7,990,097 B2 * | 8/2011 | Cheng et al. | 318/800 |
| 8,217,533 B2 * | 7/2012 | Jones et al. | 307/82 |
| 2007/0177411 A1 * | 8/2007 | Picard | 363/35 |
| 2010/0072824 A1 | 3/2010 | Abolhassani et al. | |
| 2010/0073970 A1 | 3/2010 | Abolhassani et al. | |

FOREIGN PATENT DOCUMENTS

| | | |
|---|---|---|
| GB | 2426639 A | 11/2006 |
| JP | 2001196244 A | 7/2001 |
| JP | 2003012739 A | 1/2003 |

OTHER PUBLICATIONS

J. Clare, "Advanced Power Converters for Universal and Flexible Power Management in Future Electricity Networks," Sixth Framework Programme, CRISTAL Seminar, Dec. 16, 2008, pp. 1-29.
JP2003012739 Abstract, Jan. 15, 2003.

* cited by examiner

*Primary Examiner* — Nguyen Tran
(74) *Attorney, Agent, or Firm* — Jason K. Klindtworth (57) ABSTRACT

A power conversion system includes a power transformer for receiving AC power at a first voltage from an input side and for delivering AC power at a second voltage to an output side. A power converter is also included in the power conversion system wherein the power converter includes an input side converter on the input side and an output side converter on the output side coupled through a plurality of DC links. A converter controller in the power converter provides control signals to the input side converter and the output side converter for regulating an active power and a reactive power flow through the power converter. Each of the input side converters and the output side converters includes at least two power converter transformers coupled between respective power converter bridges coupled to the plurality of DC links and the input side or to the plurality of DC links and the output side.

26 Claims, 5 Drawing Sheets

POWER CONVERSION SYSTEM AND METHOD

BACKGROUND

Embodiments of the invention relate generally to an electric power grid and more specifically to a system and method for transmitting electric power.

The basic structure of an electric power system comprises various hardware elements such as generators, transformers, power lines, and real-time monitoring equipment, as well as software such as power flow analysis software, fault detection software, and restoration software for generation, transmission, and distribution of electricity.

A frequently occurring situation in an electric power system is the need to transmit more power over the system than it was originally designed for. In cases where there is a need to transmit more power, and building new transmission lines is prohibitive due to cost, right-of-way, or environmental constraints, increased utilization of existing transmission lines and equipment is desirable.

Furthermore, with increased distributed generation, the integration of distributed generators into existing power systems presents technical challenges such as voltage regulation, stability, power quality problems. Power quality is an essential customer-focused measure and is greatly affected by the operation of a distribution and transmission network.

Flexible alternating current transmission system (FACTS) devices may be one of the solutions to the above problems. FACTS devices are power electronic-based devices and are able to provide active and reactive power compensations to power systems. However, FACTS devices are costly and in present configurations, a fault on the FACTS device may result in a power outage to a significant number of customers.

For these and other reasons, there is a need for an improved power conversion system and method.

BRIEF DESCRIPTION

In accordance with an embodiment of the present invention, a power conversion system including a power transformer for receiving AC power at a first voltage from an input side and for delivering AC power at a second voltage to an output side is provided. The power conversion system also includes a power converter including an input side converter on the input side and an output side converter on the output side coupled through a plurality of DC links. The power converter also includes a converter controller for providing control signals to the input side converter and the output side converter for regulating an active power and a reactive power flow through the power converter. Each of the input side converters and the output side converters includes at least two power converter transformers coupled between respective power converter bridges coupled to the plurality of DC links and the input side or to the plurality of DC links and the output side.

In accordance with another embodiment of the present invention, a method of transmitting electric power from an input side to an output side is provided. The method includes coupling the input side and the output side through a power transformer and a power converter including an input side converter on the input side and an output side converter on the output side coupled through a plurality of DC links. The method also includes regulating an active power and a reactive power flow through the power converter by controlling the input side converter and the output side converter and disconnecting the power transformer from the input side or the output side or both sides during a fault condition on the power transformer. Each of the input side converters and the output side converters comprises at least two power converter transformers coupled between respective power converter bridges coupled to the plurality of DC links and the input side or to the plurality of DC links and the output side.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, the terms "connected" and "coupled" are used interchangeably and could mean direct or indirect connections unless noted.

Figure 1:
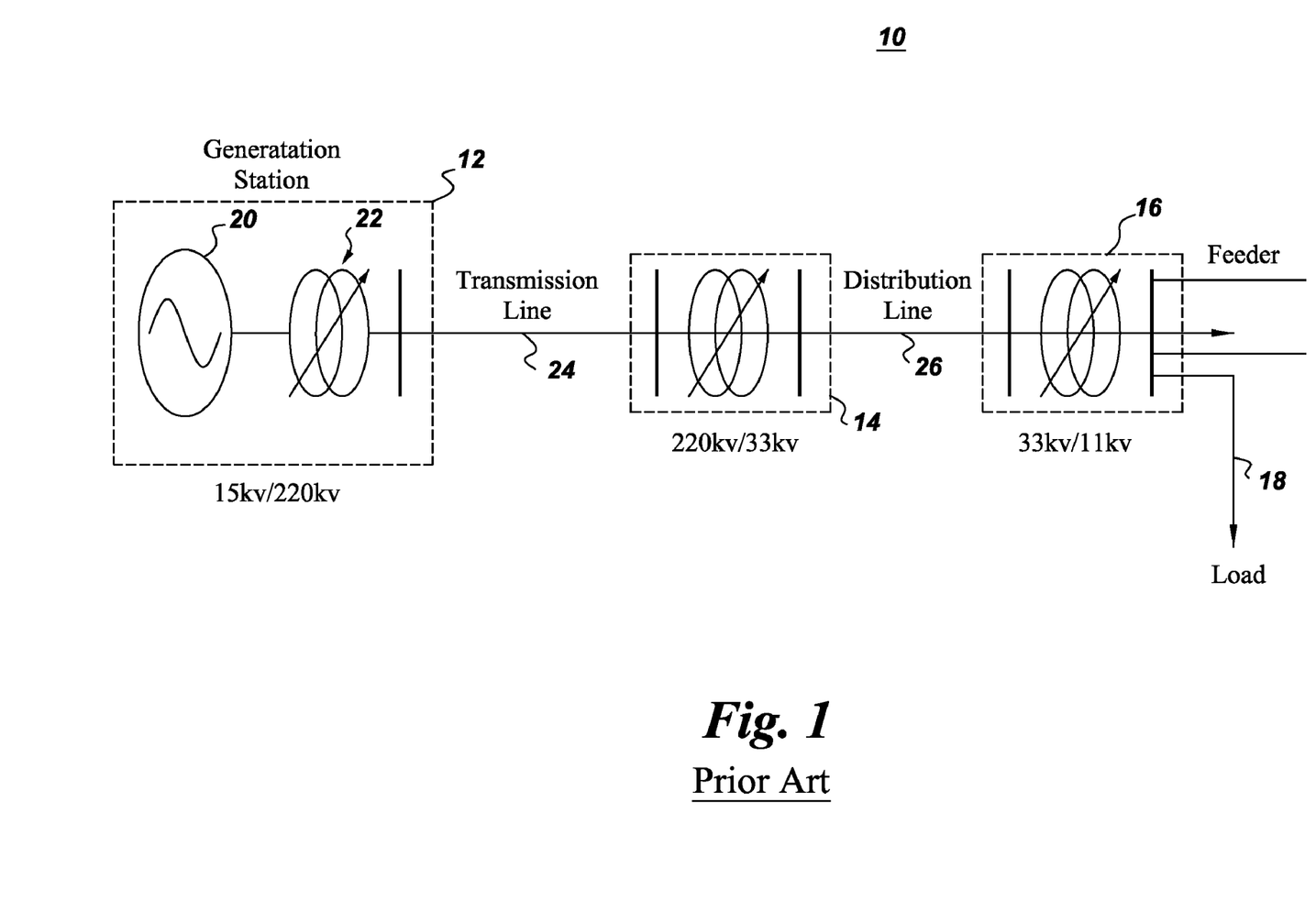
FIG. 1 is a diagrammatical representation of an overall electric power system.

FIG. 1 illustrates a single line diagram of an overall electric power system 10 from generation to utilization. Electric power system 10 includes a generating station 12, a transmission substation 14, local substations or distribution substations 16 and loads 18. Generating station 12 may comprise a hydropower generating station, a thermal power generating station, a wind power generating station, or a solar power generating station, for example. Generator 20 in generating station 12 generates electricity at a generating station voltage which in certain embodiments may range from 4 kV to 13 kV. The generating station voltage is stepped up to a higher transmission level voltage such as 110 kV in an embodiment by a generating station transformer 22 for more efficient transfer of the electricity.

The electricity is transmitted at the transmission level voltage to transmission substation 14 by primary transmission lines 24 that are configured to carry electricity over long distances. At transmission substation 14, a reduction in voltage occurs for distribution to other points in the system through distribution lines 26. Further voltage reductions for commercial and industrial or residential loads 18 may occur at distribution substation 16. Distribution substation 16 may supply electricity at voltages in the range of 4 kV to 69 kV, for example. The voltages may further by reduced by one or two more levels at other local substations (not shown) receiving power from distribution substation 16 to supply the electricity to residential loads at lower voltages such as 120 V or 240 V.

Current and voltage ratings of transmission lines 24 determine a transmission capacity of transmission lines 24 which is generally measured in terms of MVA loading (S). The MVA loading is a vector sum of an active power or a real power (P) and a reactive power (Q) and is given as P+jQ. Thus, the reactive power Q which does not produce any work or energy puts a limit on the amount of active power P that can be transmitted though the transmission line 24. However, if the reactive power Q is supplied locally (e.g., at distribution station 16), the amount of active power transferred can be increased.

Figure 2:
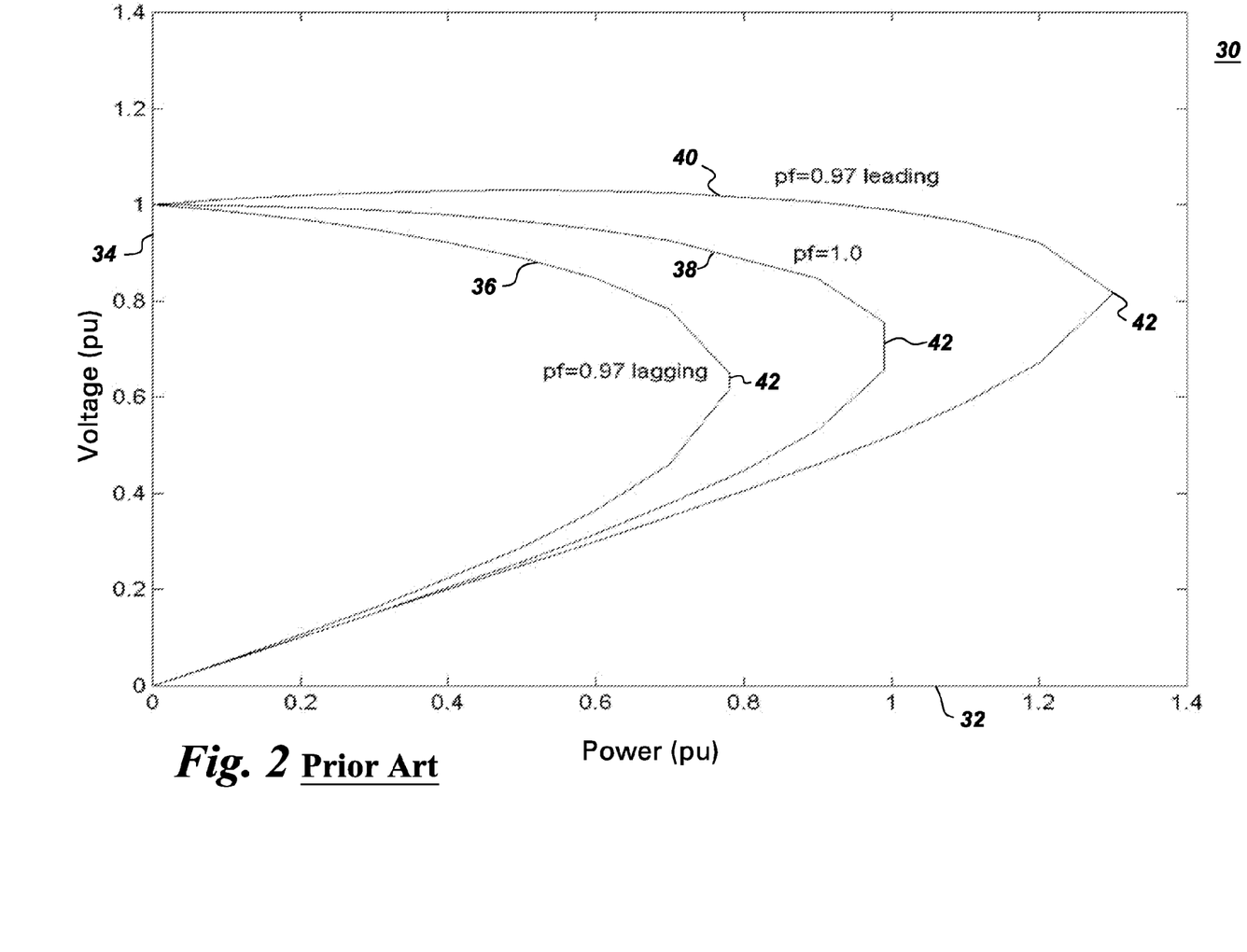
FIG. 2 is a graphical representation of a power-voltage (P-V) curve.

FIG. 2 shows a graphical representation 30 of a power-voltage (P-V) curve. A horizontal axis 32 represents the active power P in terms of per unit (pu) and a vertical axis 34 represents a line voltage in pu. Three plots 36, 38, 40 represent P-V curves for three different power factors (i.e., 0.97 lagging, unity, and 0.97 leading respectively). A nose point 42 on each of the curves represents a voltage stability limit at the respective power factor. As will be appreciated by those skilled in the art, a nose point refers to a point after which voltage collapse occurs. That is, although with increased load or the active power, the line voltage also varies slightly but beyond nose point 42, the voltage decreases sharply to 0 pu. This condition results from reactive power losses significantly exceeding the reactive resources available to supply them. As can be seen from the three curves 36, 38, 40, the line voltage variation depends on the power factor and with higher or leading power factors, the nose point occurs at higher voltages. In other words with higher or leading power factors, the system becomes more stable.

A power conversion system in accordance with an embodiment of the present invention provides reactive power to the power line to improve the power factor and consequently the voltage stability as discussed above. Other applications of the power conversion system include harmonic current compensation, power system oscillations damping, low voltage ride through capability and voltage regulation, for example.

Figure 3:
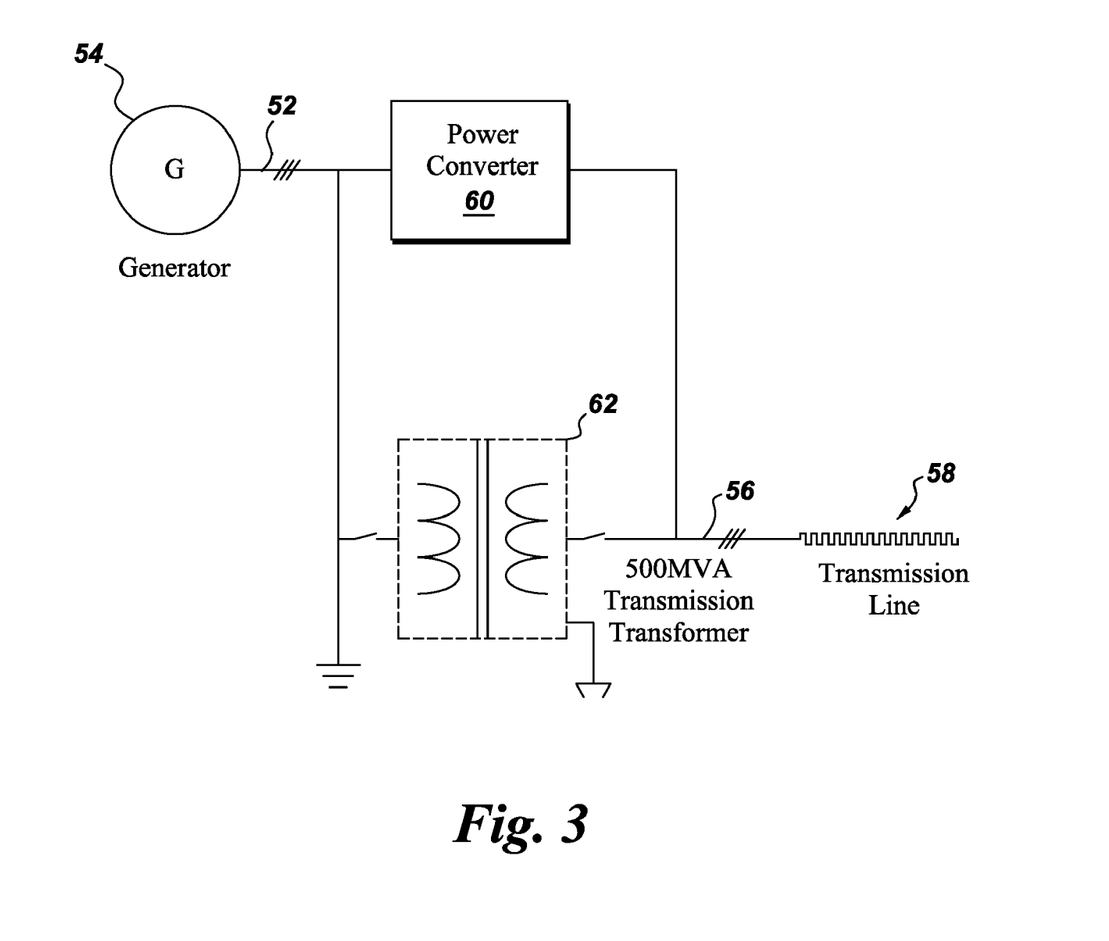
FIG. 3 is a diagrammatical representation of a power conversion system in accordance with an embodiment of the present invention.

FIG. 3 shows a power conversion system 50 in accordance with an embodiment of the present invention. Although the example provided in FIG. 3 depicts a three-phase power conversion system, this is not limiting of the teachings herein. Power conversion system 50 includes a power converter 60 and a main transformer 62 which provide coupling between a lower voltage side 52 and a higher voltage side 56. In the embodiment shown, lower voltage side 52 is on a generator side 54, whereas higher voltage side 56 is on transmission line 58. However, in other embodiments, the lower voltage side may be on a load side and higher voltage side may be on the transmission line side.

In the embodiment shown, power converter 60 and main transformer 62 are connected in parallel. However, other configurations, such as inputs of power converter 60 and main transformer 62 being connected in series and outputs being connected in parallel or vice versa, are also within scope of this invention. In general, during normal operating conditions, some part of the power from low voltage side 52 is processed through main transformer 62 and remaining part of the power is processed through power converter 60. The ratio of the power that can be to be processed through power converter 60 and main transformer 62 depends on the rating of main transformer 62 and power converter 60 as well as the control aspects of the application. During an abnormal condition, i.e., when there is a fault on a main transformer, main transformer 62 is disconnected from the low voltage side or the high voltage side or both, and a maximum possible power is transmitted through power converter 60. The maximum possible power again depends on the voltage or current or power rating of power converter 60. In one embodiment, the power rating of power converter 60 is small compared to main transformer 62. For example, if the power rating of main transformer 62 is 500 MVA, then the rating of power converter 60 may be 100 MVA.

Furthermore during normal operation, main transformer 62 merely transmits the power coming from lower voltage side 52 to higher voltage side 54 by changing the level of the voltage. Whereas, power converter 60 injects a controllable active and reactive power into higher voltage side 54. The amount of current that power converter 60 injects into higher voltage side 54 depends on the application. The applications as discussed in the preceding paragraph may include reactive power compensation, harmonic current compensation, transient and steady state stability management etc.

Figure 4:
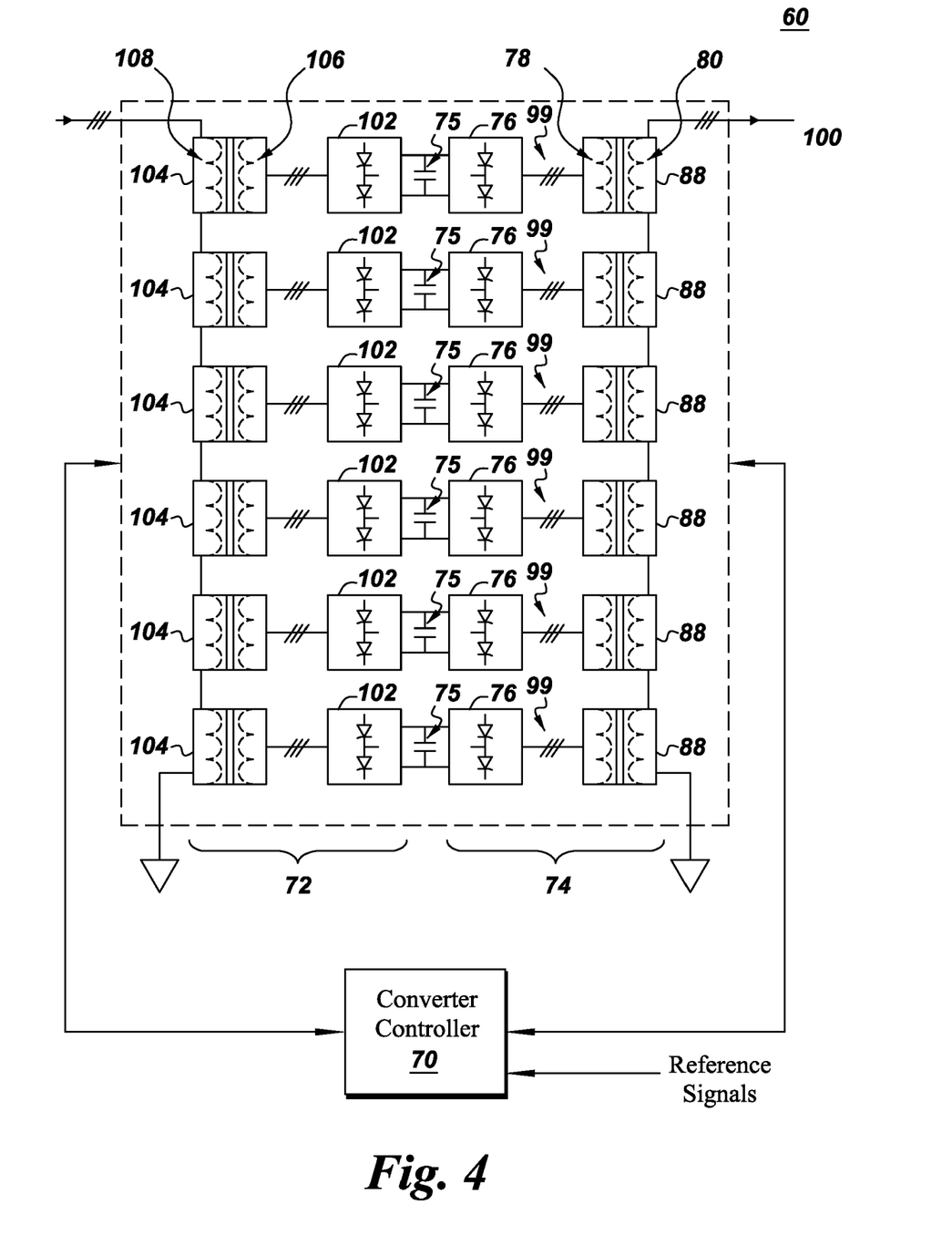
FIG. 4 is a schematic representation of a power converter of FIG. 3 in accordance with an embodiment of the present invention.

FIG. 4 shows a schematic of power converter 60 of FIG. 3 in accordance with an embodiment of the present invention. Power converter 60 includes an input side converter 72 and an output side converter 74 coupled through a plurality of DC link capacitors 75. In one embodiment, a three-phase input signal is received by input side converter 72 from a generator (not shown); while a three-phase output signal is provided by output side converter 74 to a transmission line. The input side and the output side may be the high voltage side and the low voltage side respectively or the low voltage side and the high voltage side respectively. In one embodiment, the input side and the output side may be at the same voltage level if main transformer 62 is not used. A converter controller 70 monitors as well as controls the condition of input side converter 72 and output side converter 74 based on reference signals which may include voltage signals, current signals, or active and reactive power signals, for example.

Output side converter 74 comprises at least two output side converter bridges 76 and at least two output side converter transformers 88. In the embodiment shown, six output side converter bridges 76 and six respective output side converter transformers 88 are utilized. Each component is described in further detail below.

In one embodiment, converter controller 70 is configured to control output side converter bridges 76 to switch at a low frequency and generate a corresponding converter output voltage including a fundamental voltage component and harmonic components. In an embodiment, the low switching frequency ranges from 60 Hz to 180 Hz for a fundamental frequency of 60 Hz. In another embodiment, output side converter bridges may be operating at high frequency. For example, in one embodiment, the high frequency may be 2 kHz. The converter output voltage of power converter bridges 76 is generated on a plurality of AC lines 99.

Output side converter transformers 88 are configured to generate an output voltage 100 by changing the level of the voltage of AC line 99 to match it to the voltage of the output side of the power line. Resultant output voltage 100 comprises a sum of the fundamental voltage components of the output voltage of each output side converter bridge 76. In one embodiment, resultant output voltage 100 is substantially free of any harmonic component that exists in the converter output voltages of output side converter bridges 76. Substantially free refers to a resultant output voltage that does not include low order harmonic components such as $5^{th}$, $7^{th}$, $11^{th}$ or $13^{th}$.

Each output side converter bridge 76 is coupled to a primary winding 78 of a respective output side converter transformer 88. Typically each output side converter transformer comprises a three-phase transformer. In one embodiment, primary winding 78 of each output side converter transformer 88 is connected in a three phase delta mode (i.e., three phase delta winding).

In another embodiment, a secondary winding 80 of output side converter transformer 88 comprises a single winding per phase with open neutral. Secondary windings 80 of all output side converter transformers 88 are then typically connected in series. In one embodiment, secondary windings 88 may be connected in parallel. In another embodiment, some secondary windings may be connected in series and groups of series connected windings may be connected in parallel. In yet another embodiment, secondary windings 88 may be oriented such that each of the secondary windings is phase-shifted by an angle with respect to a secondary winding of another transformer to cancel low order harmonics in output voltages. In an alternative embodiment, the primary and secondary winding may comprise a zigzag winding.

In a more specific embodiment, converter controller 70 is configured to control output side converter bridges 76 to switch with a phase shift. The gating signals for output side converter bridges 76 are derived so that the fundamental components of the converter output voltages are shifted in phase with respect to one another. In one embodiment, the phase-shifted gating signals, when combined with phase shifting in secondary winding 80 of output side converter transformers 88, results in canceling of the low-order harmonic components from the resultant output voltage. The order of harmonics cancelled depends on the number of pairs of converter-transformer units used. The number of pairs and level of phase shifting can be selected such that a high power quality resultant output voltage is derived at a relatively low switching frequency.

The structure of input side converter 72 is similar to the output side converter 74. That is input side converter 72 also includes at least two input side converter bridges 102 and two input side converter transformers 104. Input-side converter bridges 102 are each coupled to the input lines via the corresponding input-side converter transformer 104. In addition, input-side converter bridges 102 are coupled to secondary windings 106 of input-side converter transformers 104, whereas primary windings 108 of input-side converter transformers 104 may be connected in series or parallel or in a combination of series-parallel as described with secondary windings 80 of power converter transformer 88. Further, input-side converter bridges 102 of input-side converter system 72 may be switched in a similar manner as output side converter bridges 76.

In a further embodiment, converter controller 70 is further configured to control an active power flow from the input side converter bridges 102 and output side converter bridges 76. In one embodiment, the active power output is controlled by controlling a phase angle of the fundamental component of the resultant output voltage on the output side whereas the reactive power input is controlled by controlling an amplitude of the voltage of the DC link capacitors 75.

In another embodiment, power converter 60 is further configured to control a reactive power flow from the input side and output side converter bridges 76 and 102. In this embodiment, the reactive power is typically controlled by adjusting a resultant magnitude or amplitude of the fundamental component of the resultant output voltage on the output side or the input side.

In one embodiment, converter controller 70 may control the input side and output side converter bridges 102 and 76 to generate a reference current or voltage command signals on the output side which may further result in changes of active and reactive power flow. The reference current or voltage command signals may depend on the application for which present power converter 60 may be employed. For example, the applications may include reactive power compensation, harmonic current compensation, power system oscillations damping, low voltage ride through capability and voltage regulation. It should be noted that, in general, irrespective of the application, when voltages and currents of power converter 60 are controlled, the active and reactive power also gets controlled by default. This is so because active and reactive power are finally functions of voltages and currents In one embodiment, connections of windings of input and output side converter transformers may be changed from one type to another when main transformer 62 (FIG. 3) is disconnected from the system. For example, in one embodiment, groups of series connected primary windings of input side transformers may be connected in parallel which may further be connected in series with main transformer 62 during normal conditions. However, when main transformer 62 is taken out due to fault or for maintenance purposes, the connection of primary windings of input side transformers may be changed such that the primary windings of all input side transformers are connected in series. The connection changes may be done to reconfigure power converter 60 to handle the system voltages and transfer the maximum possible power from input side to the output side.

Figure 5:
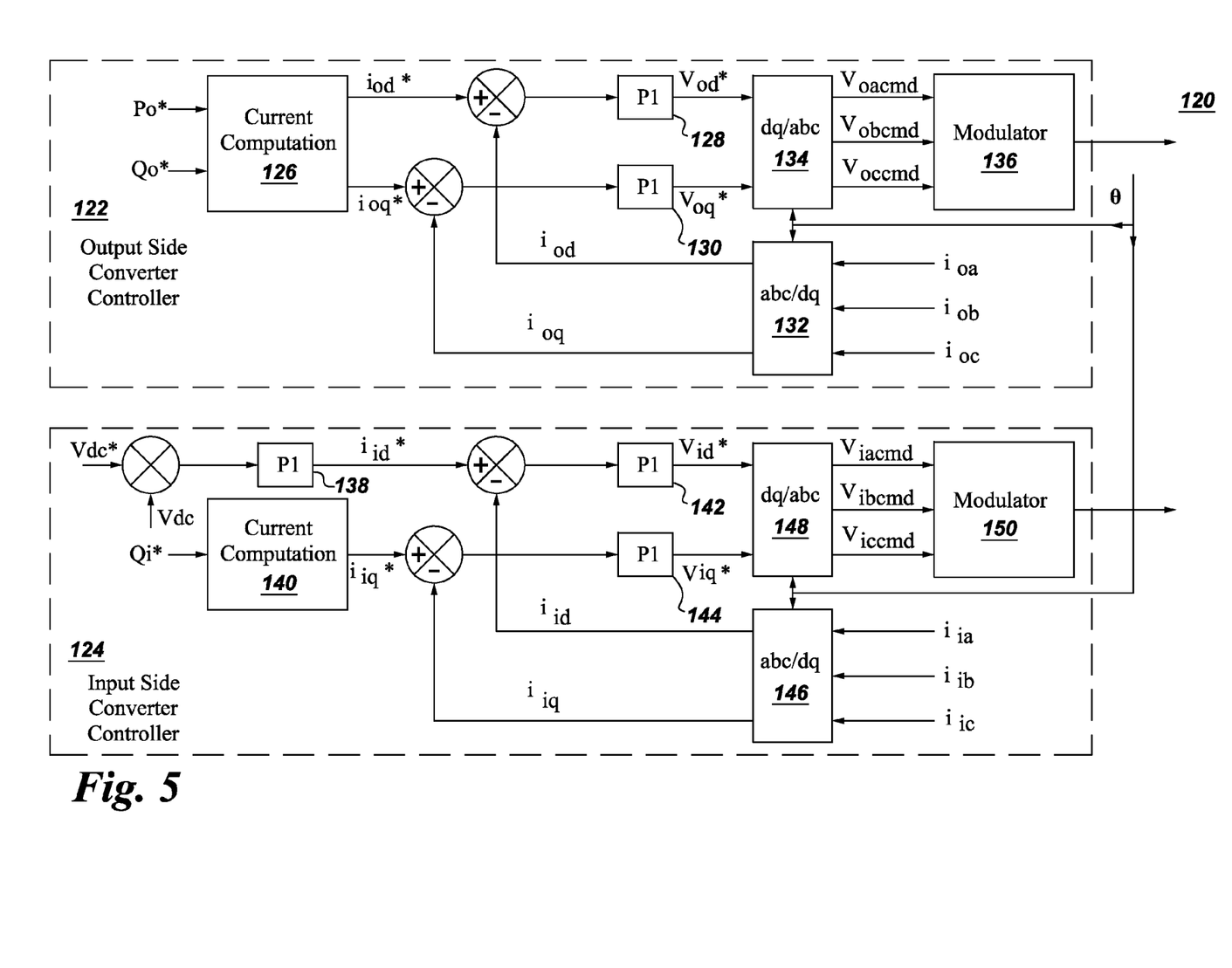
FIG. 5 is a block diagram of a controller in accordance with an embodiment of the present invention.

FIG. 5 shows an exemplary block diagram of a controller 120 in accordance with an embodiment of the present invention. Controller 120 includes an output side converter controller 122 and an input side converter controller 124. It should be noted that controller 120 is only a part of the converter controller 70 of FIG. 4. In other words, output side converter controller 122 and input side converter controller 124 shown are only for individual output and input side converter bridges 76 and 102. In one embodiment, multiple such controllers 120 may be utilized in the converter controller 70 for multiple converter bridges, such as those shown in FIG. 4. These multiple controllers may be connected together in one embodiment or may be reduced to a single controller without deviating from the scope of the invention.

Both controllers 122 and 124 utilize an angle θ generated from a three phase-phase locked loop (PLL) (not shown) in transformation matrices which transform voltage or current signals from one reference frame to another reference frame. Output side controller 122 receives reference signals, output side bridge active power $P_o^*$ and output side bridge reactive power $Q_o^*$ as inputs. In one embodiment, the output side bridge active power signal $P_o^*$ and output side bridge reactive power signal $Q_o^*$ may be generated by dividing the total output active and reactive power required from output side converter 74 (FIG. 4) by a number of power converter bridges utilized in output side converter 74. For example, if the total output active and reactive power required from output side converter 74 is 50 MW and 50 MVAR respectively and the number of converter bridges utilized are 5, then each of the converter bridges will need to output 10 MW active power and 10 MVAR reactive power respectively.

A current computation block 126 computes d-q domain output side bridge reference current signals $i_{od}^*$ and $i_{oq}^*$ from output side bridge active and reactive power signals $P_o^*$ and $Q_o^*$ respectively. In one embodiment, the d-q domain signals refer to signals in a synchronous reference frame (i.e., a reference frame rotating at synchronous speed). Two proportional integral (PI) regulators 128, 130 then generate d-q domain output side bridge reference voltage signals $V_{od}^*$ and $V_{oq}^*$ based on error signals between d-q domain output side bridge reference current signals $i_{od}^*$ and $i_{oq}^*$ and d-q domain output side bridge actual current signals $i_{od}$ and $i_{oq}$ respectively. The d-q domain actual current signals $i_{od}$ and $i_{oq}$ are generated by an abc-dq transformation matrix 132 from a-b-c domain output side actual bridge currents $i_{oa}$, $i_{ob}$, and $i_{oc}$. In one embodiment, the abc-dq transformation matrix 132 may be given as $$\sqrt{\frac{2}{3}} \begin{bmatrix} \cos\theta & \cos(\theta - 2\frac{\pi}{3}) & \cos(\theta + 2\frac{\pi}{3}) \\ \sin\theta & \sin(\theta - 2\frac{\pi}{3}) & \sin(\theta + 2\frac{\pi}{3}) \end{bmatrix} \quad (1)$$

where θ is given as ωt, ω representing frequency of transmission line voltage in rad/seconds and t representing time in seconds.

A dq-abc transformation matrix 134 converts d-q domain voltage signals $V_{od}*$ and $V_{oq}*$ into a-b-c domain output side bridge reference voltage command signals $V_{oacmd}$, $V_{obcmd}$ and $V_{occmd}$. The dq-abc transformation matrix may be given as:

$$\sqrt{\frac{2}{3}} \begin{bmatrix} \cos\theta & \sin\theta & \frac{1}{\sqrt{2}} \\ \cos(\theta - 2\frac{\pi}{3}) & \sin(\theta - 2\frac{\pi}{3}) & \frac{1}{\sqrt{2}} \\ \sin(\theta + 2\frac{\pi}{3}) & \sin(\theta + 2\frac{\pi}{3}) & \frac{1}{\sqrt{2}} \end{bmatrix} \quad (2)$$

A modulator 136 then generates gating signals for output side bridge converter 76 (FIG. 4) to generate the voltage command signals $V_{oacmd}$, $V_{obcmd}$ and $V_{occmd}$. In one embodiment, modulator 136 may be a pulse width modulation (PWM) modulator. Further the PWM modulator may a sine-triangle PWM modulator or space vector PWM modulator.

The structure of the input side controller 124 is more or less similar to output side controller 122. The objective of the input side controller 124 is to control input side bridge converter 102 (FIG. 4) for maintaining the voltage at the DC link 75 (FIG. 4) and for generating a required reactive power set by an operator. Input side controller 124 receives reference signals, DC link voltage $V_{dc}*$ and input side bridge reactive power $Q_i*$ as inputs. As discussed earlier, the input side bridge reactive power $Q_i*$ signal may also be generated by dividing the total reactive power required from input side converter 102 by a number of power converter bridges utilized in input side converter 102.

A voltage PI regulator 138 generates a d domain input side bridge reference current signal $i_{id}*$ based on an error between the actual DC link voltage $V_{dc}$ and the reference DC link voltage $V_{dc}*$ whereas a current computation block 140 generates q domain input side bridge reference current signal $i_{iq}*$. As with output side converter controller 122, two proportional integral (PI) regulators 142, 144 then generate d-q domain input side bridge reference voltage signals $V_{id}*$ and $V_{iq}*$ based on error signals between d-q domain input side bridge reference current signals $i_{id}*$ and $i_{iq}*$ and d-q domain input side bridge actual current signals $i_{id}$ and $i_{iq}$ respectively. The actual current signals $i_{id}$ and $i_{iq}$ are generated by an abc-dq transformation matrix 146 from a-b-c domain input side actual bridge currents $i_{ia}$, $i_{ib}$, and $i_{ic}$. Finally, a dq-abc transformation matrix 148 converts d-q domain voltage signals $V_{id}*$ and $V_{ic}*$ into a-b-c domain input side bridge reference voltage command signals $V_{iacmd}$, $V_{ibcmd}$ and $V_{iccmd}$, which are then generated by the input side converter bridge 102 (FIG. 4) after receiving gating signals from a modulator 150.

It should be noted that controller 120 shown here is merely exemplary and other controller structures which may be used to control embodiments of the power converter of the present invention are very much within scope of this invention. The objective of such controllers may include harmonic current compensation, power system oscillations damping, low voltage ride through capability and voltage regulation.

One of the advantages of the presented power conversion system is that it utilizes low power and hence cheap modular building blocks comprising converter bridges and transformers compared to high power and costly FACTS devices. Thus, when one of the building blocks fails it can be replaced immediately by a backup building block ensuring continuity of power supply. Further, it can transmit a reduced power even when the main transformer fails.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power conversion system comprising:
a power transformer for receiving AC power at a first voltage from an input side and for delivering AC power at a second voltage to an output side;
a power converter comprising:
a plurality of input side converters on the input side and a plurality of output side converters on the output side coupled through a plurality of DC links;
a converter controller to provide control signals to the input side converter and the output side converter for regulating an active power and a reactive power flow through the power converter;
wherein each of the input side converters and the output side converters comprises at least two power converter transformers coupled between respective power converter bridges coupled to the plurality of DC links and the input side or to the plurality of DC links and the output side.

2. The power conversion system of claim 1, wherein the power transformer is disconnected from the input side or the output side or both sides during a fault condition on the power transformer.

3. The power conversion system of claim 1, wherein the power transformer and the power converter are connected in parallel.

4. The power conversion system of claim 1, wherein input terminals of the power converter and the power transformer are connected in series and output terminals are connected in parallel.

5. The power conversion system of claim 1, wherein input terminals of the power converter and the power transformer are connected in parallel and output terminals of the power converter and the power transformer are connected in series.

6. The power conversion system of claim 1, wherein the converter controller provides control signals based on an application comprising one of a reactive power compensation, harmonic current compensation, or transient and steady state stability management.

7. The power conversion system of claim 1, wherein a first winding of the power converter transformer comprises a three phase delta winding and a second winding of the power converter transformer comprises a single winding per phase with open neutral.

8. The power conversion system of claim 7, wherein the second windings of all the power converter transformers on the input side or the output side are connected in series or in parallel or in groups of series connected windings which are connected in parallel.

9. The power conversion system of claim 8, wherein when the power transformer is disconnected, connections of second windings of all the power converter transformers on the input side or on the output side are modified to transfer a maximum possible power, wherein the maximum possible power depends on voltage or current or power ratings of the power converter bridges.

10. The power conversion system of claim 1, wherein regulating the active power comprises controlling a phase angle of an output voltage of the power converter bridge or an amplitude of at least one of the plurality of DC link voltages.

11. The power conversion system of claim 1, wherein regulating the reactive power comprises controlling an amplitude of an output voltage of the power converter bridge.

12. The power conversion system of claim 1, wherein the converter controller comprises a modulator for generating gate signals for power converter bridges based on a-b-c domain voltage reference signals.

13. The power conversiton system of claim 12, wherein the modulator comprises a sine-triangle pulse width modulator or space vector pulse width modulator.

14. The power conversion system of claim 12, wherein the converter controller comprises a transformation module to transform d-q domain voltage reference signals into the a-b-c domain voltage reference signals.

15. The power conversion system of claim 12, wherein the converter controller comprises proportional integral (PI) controllers to generate the d-q domain voltage reference signals based on an error between d-q domain current reference signals and d-q domain actual current signals.

16. The power conversion system of claim 15, wherein the d-q domain current reference signals are generated based on reference active and reactive power signals.

17. A method of transmitting electric power from an input side to an output side comprising:
coupling the input side and the output side through a power transformer and a power converter including plurality of input side converters on the input side and a plurality of output side converters on the output side coupled through a plurality of DC links;
regulating an active power and a reactive power flow through the power converter by controlling the input side converter and the output side converter;
wherein each of the input side converters and the output side converters comprises at least two power converter transformers coupled between respective power converter bridges coupled to the plurality of DC links and the input side or to the plurality of DC links and the output side.

18. The method of claim 17, further comprising disconnecting the power transformer from the input side or the output side or both sides during a fault condition on the power transformer.

19. The method of claim 17, wherein coupling the input side and the output side comprises connecting input terminals of the power converter and the power transformer in series and output terminals in parallel.

20. The method of claim 17, wherein regulating the active power and the reactive power flow is based on an application comprising one of a reactive power compensation, harmonic current compensation, or transient and steady state stability management.

21. The method of claim 17, wherein regulating the active power comprises controlling a phase angle of an output voltage of the power converter bridge or an amplitude of at least one of the plurality of DC link voltages.

22. The method of claim 17, wherein regulating the reactive power comprises controlling an amplitude of an output voltage of the power converter bridge.

23. The method of claim 17, wherein controlling the input side converter and the output side converter comprises providing gate signals to power converter bridges based on a-b-c domain voltage reference signals.

24. The method of claim 23, wherein controlling the input side converter and the output side converter further comprises transforming d-q domain voltage reference signals into the a-b-c domain voltage reference signals.

25. The method of claim 23, wherein the d-q domain voltage reference signals are generated based on an error between d-q domain current reference signals and d-q domain actual current signals.

26. The method of claim 25, wherein the d-q domain current reference signals are generated based on reference active and reactive power signals.

* * * * *